ELECTRONIC SWITCHING MATRIX

Filed Oct. 16, 1961 2 Sheets-Sheet 1

INVENTOR.
JOHN BEREZNAK

BY [signature]

ATTORNEY 3,201,520
ELECTRONIC SWITCHING MATRIX
John Bereznak, Chicago, Ill., assignor to International Telephone and Telegraph Corporation, New York, N.Y., a corporation of Maryland
Filed Oct. 16, 1961, Ser. No. 145,220
20 Claims. (Cl. 179—18)

This invention relates to electronic switching matrices and more particularly to matrices for automatic telephone systems. The invention is an improvement over a co-pending application entitled Electronic Switching Telephone System, Serial No. 17,003, filed March 23, 1960 by Virgle E. Porter, assignor to the assignee of this invention.

In spite of the fact that much attention has been given to the development of electronic switching matrices, those developed thus far have inherent drawbacks. For example, one type of these matrices is designed for use in "end marked" cascaded switching networks. Here the ends of a desired switching path are marked electrically and electronic switch crosspoints in the matrices complete circuits which fan out from the marked ends toward the middle of the matrices. When two of the fanning out circuits collide, a switching path is completed between the two end marked points. Thereafter all remaining ones of the fanning out circuits are released. The trouble is that the electronic switch at the end point must carry an unduly heavy current as the fanning out paths multiply.

To avoid this heavy current, complex control circuitry has been used to mark the desired path by priming node points in the matrices. This priming eliminates the fanning-out circuits and, therefore, the heavy current. Unfortunately, however, these control circuits are extremely complex and expensive.

Another way to prevent excessive fan-out current at end points is to use charged capacitors to provide most of the current required for switching inside the matrix. These matrices have included electronic switch crosspoints which turn "on" and "off" in a completely random manner until a path finds its way through the matrix. While this random path matrix is a vast improvement over the priming type matrix, the very randomness of the switch selection leaves room for improvement.

Hereinafter, the word "systematic" is used to describe a self-seeking search which occurs in the matrix or switching network. It is a complete search which explores all idle paths according to an orderly plan. That is, crosspoints switch "on" and "off" at the mercy of chance—guided only by such things as variations within manufacturers tolerances for crosspoints, charges and currents in the network, busy conditions, etc. Without a plan for searching, one might expect these random tolerance variations, charges, etc. to cause some paths to be reexplored before other paths are explored. Thus, the plan insures an integrity or completeness of the search. Moreover, the plan contemplates searches wherein individual paths are explored in sequence, as distinguished from the fanout networks where the paths are explored simultaneously.

Accordingly, an object of this invention is to provide new and improved electronic switching matrices. A more specific object is to provide such matrices especially— although not exclusively—adapted for use in electronic switching telephone systems.

Another object is to provide end-marked electronic switching matrices having self-selecting crosspoints which avoid fan-out current problems and yet do not require expensive control circuitry. Moreover, an object is to overcome the problems common to completely random selected crosspoint systems without losing the benefits of the random selections. Consequently, an object is to provide end marked matrices for extending self-seeking paths through electronic switch crosspoints in a more orderly manner.

Still another object is to provide rugged and reliable telephone switching devices which use electronic components. A related object is to provide electronic networks using readily available, low cost switching devices.

In accordance with one aspect of this invention, an electronic switching matrix is formed of first and second (or horizontal and vertical) multiples arranged to provide intersecting cross points. A PNPN diode connects the intersecting multiples at each crosspoint. Thus, the intersecting multiples are electrically joined when the associated diodes are switch "on" and electrically isolated when the diodes are switched "off."

In carrying out the invention, full use is made of the "rate effect" firing of PNPN diodes. The term "rate effect" describes the characteristic of a PNPN diode that causes it to fire at a relatively high-voltage when a potential applied across it rises slowly and at a relatively low-voltage when the potential rises fast. This rise time is sometimes called the "$dv/dt$" of the applied voltage. Thus, merely by controlling the rise time of a control voltage, the matrix switching can be completed in an orderly manner.

The above mentioned and other features and objects of this invention and the manner of obtaining them will become more apparent, and the invention itself will be best understood by making reference to the following description of an embodiment of the invention taken in conjunction with the accompanying drawings wherein.

Figures 6, 7A, 7B, 7C, 7D, 8A, 8B, 9:
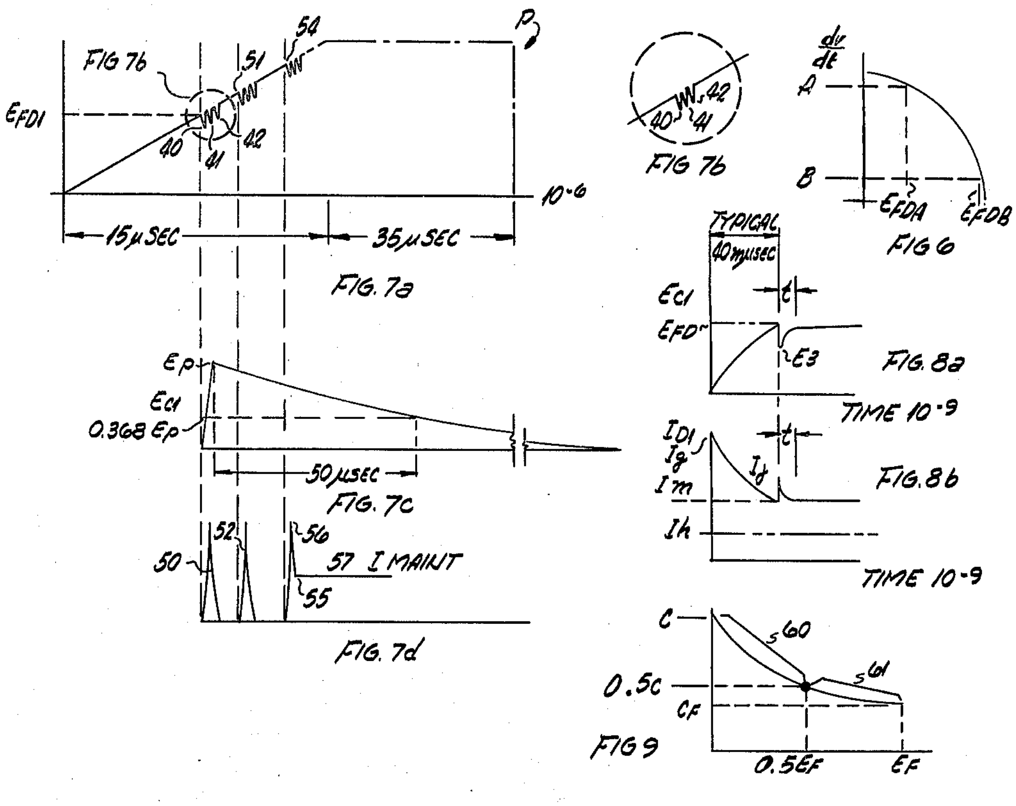
FIG. 6 is a characteristic curve showing the rate effect changes of a PNPN diode firing potential.

FIGS. 7*a*–7*d* are characteristic curves showing how PNPN diodes in the matrix fire in an orderly manner because of the rate effect;

FIGS. 8*a*–8*b* are characteristic curves of capacitor voltages and peak currents plotted on a greatly enlarged scale (relative to FIG. 7) to illustrate how the circuit responds to diode firing; and FIG. 9 is a characteristic curve showing how PNPN diode capacitance changes which occur as a function of applied voltage changes, may be used to reduce crosstalk.

Figure 1:
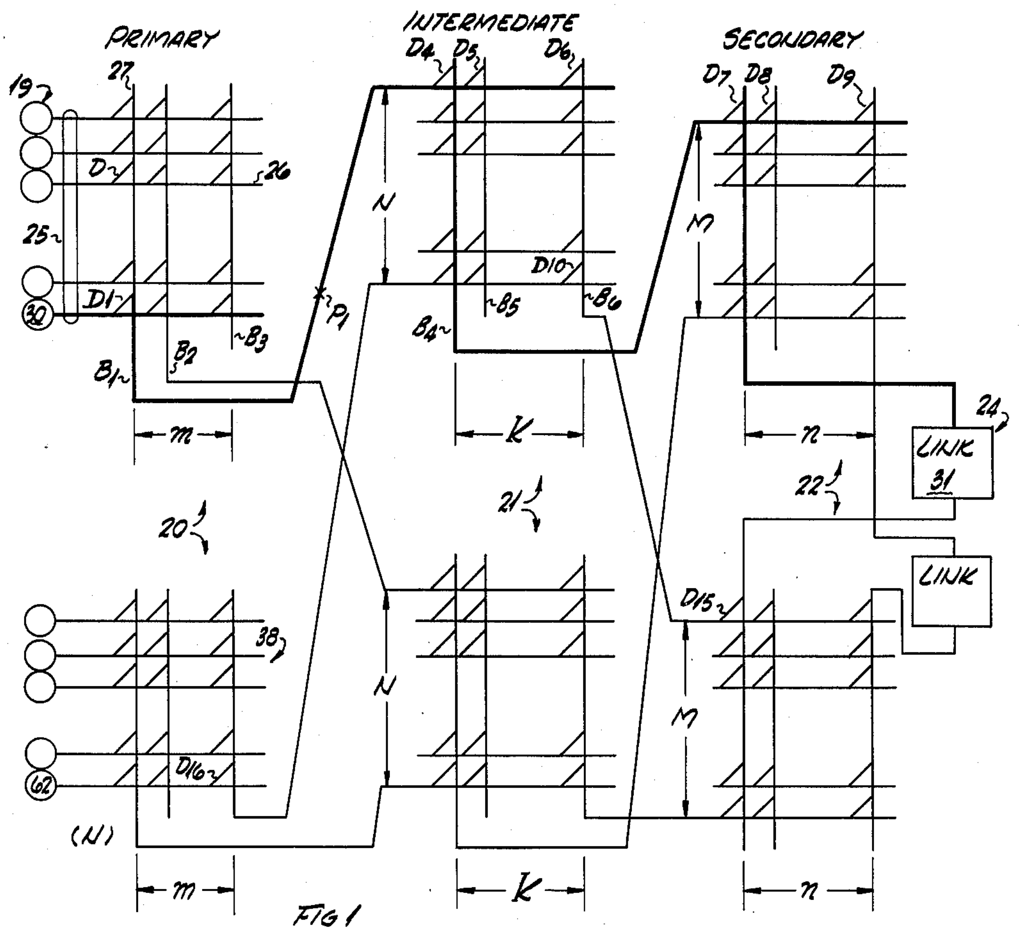
FIG. 1 shows a cascaded series of electronic switching matrices.

FIGURE 1 shows a plurality of cascaded matrices or switching arrays arranged to give automatic telephone service. The figure includes a plurality of line circuits 19, three stages of switching matrices 20–22, and a number of control links 24. These electronic matrices are here designated "primary," "intermediate," and "secondary." The switching technique applies equally well, however, to five, seven, nine, etc. matrices or switching stage arrays. In a telephone system the line circuits 19 may represent subscriber lines. In other systems, the line circuits may represent any other circuits which are to be electrically connected through the matrices.

In this exemplary system, there are "N" number of primary matrices 20, "*m*" number of intermediate matrices 21, "K" number of secondary matrices 22, and "*n*" number of links 24. Each primary matrix has a number of inlets 25 corresponding to the number of subscriber lines served by that matrix. These primary matrices have "*m*" outlets, selected on a traffic study basis, each outlet being connected to a corresponding inlet on intermediate matrices 21; therefore, each intermediate matrix has "N" inlets. By a similar reasoning, the intermediate matrices 21 have "K" outlets and the secondary matrices 22 have "M" inlets and "*n*" outlets.

The matrix itself includes first and second (or horizontal and vertical) multiples, two of which are shown at 26, 27 respectively. Theses multiples are arranged to provide a number of intersecting crosspoints, one of which is shown at D. At each crosspoint, an electronic switch such as a PNPN diode, for example, is connected between the intersecting multiples. Thus, when the switch is turned "on," the intersecting multiples are electrically connected, and when the switch is turned "off," the intersecting multiples are electrically isolated from each other.

These electronic switches fire when a voltage in excess of a "firing" potential is applied across their terminals. The vertical multiples are normally biased by a first or common reference potential. Therefore, a crosspoint diode fires when a horizontal multiple is marked by a second potential which exceeds a firing potential relative to the normal vertical or common reference potential. After a crosspoint fires, the marking potential on the horizontal multiple charges a capacitor connected to the intersecting vertical multiple and, hence, applies a voltage to a horizontal multiple of the next cascaded matrix. In this manner, the marking potential is passed on step-by-step to each succeeding cascaded matrix.

One end of a desired path through these cascaded matrices is marked from a line circuit, and the other end is marked from a link circuit. For example, a marking applied at a line circuit 30 and at link 31 might complete the path shown in FIG. 1 by a heavily inked line. Of course, many other paths may be completed also.

Figure 2:
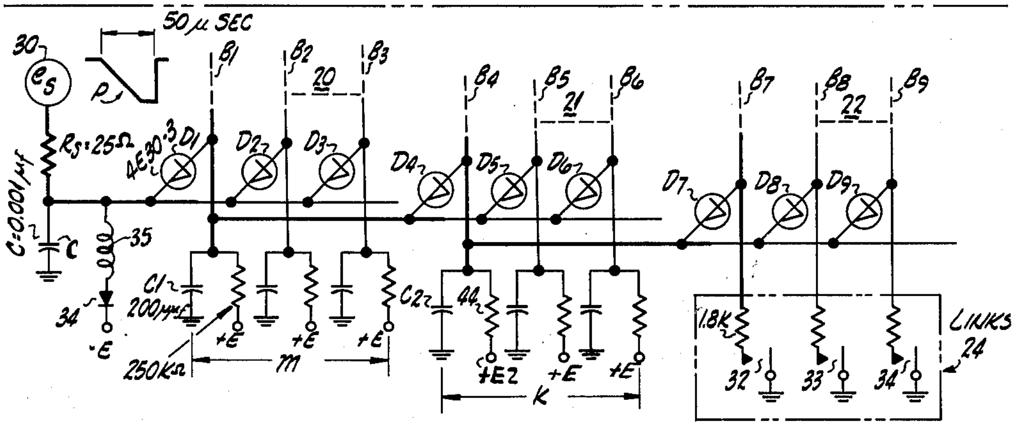
FIG. 2 shows, by schematic circuit diagram, the single path through the matrices of FIG. 1, that is marked in FIG. 1 by heavily inked lines.

The exact nature of this or a similar path through the matrices may be understood better from a study of FIG. 2. As there shown, the line circuit 30 includes a signal source $e_s$, and its internal or the source resistance R*s*. To orient the reader, it may be assumed that the heavily inked conductors of FIGS. 1 and 2 represent the same path.

When a connection to a line is desired, the end marking is applied from source $e_s$, in any suitable manner, to the left-hand end of the switch path. For example, this marking may occur in a telephone system either when a calling subscriber station goes offhook or when a register marks the line circuit of a called line. The structure that actually applies the marking may include any device capable of applying a voltage having a controlled rise time ($dv/dt$). Thus, a capacitor such as C, may be charged to provide a voltage signal having a wave form as generally shown as pulse P, and specifically shown in FIG. 7*a*.

The right-hand end of the speech path is marked from link 31 by a steady and unvarying potential, here called a "link ground." Here it may be assumed that an allotter has pre-selected a first link to serve the next call by closing contacts 32.

Each crosspoint switch includes a four layer or PNPN diode (each diode being identified by the letter "D" and a number). An exemplary diode of this type is shown in U.S. Patent 2,855,524, granted October 7, 1958 to William Shockley. The diodes are symbolically shown by the number "4" in a circle. The apex of the "4" points in the direction that positive current flows. As those familiar with PNPN diodes know, the diode has an extremely high resistance between its two end terminals or electrodes until the voltage across these electrodes reaches firing potential. Thereafter, the diode switches "on," and its resistance is extremely low. After switching "on" and as long as a minimum or holding current flows through the diode, it remains in its low resistance state. When the current falls below the holding value, however, the diode "starves," switches "off," and returns to its high resistance state.

The remaining components of FIG. 2 include a source of holding current −E, a source of "idle" potential +E, and a number of control capacitors, one of which is marked "C1." All +E batteries have the same voltage. The holding source −E connects with the switching path via an isolating diode 34 and resistor 35. Together sources −E, +E bias the PNPN diodes to less than a firing potential. The diode 34 prevents the negative marking voltage of pulse P from reaching the −E source. The resistor 35 limits current.

Figure 3:
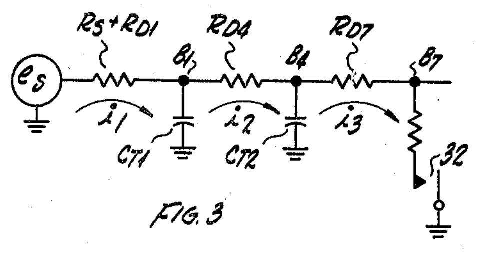
FIG. 3 is an equivalent circuit of FIG. 2 for explaining the exchange of capacitor charges and current through the matrices.

The nature of the control capacitors (such as C1) will be understood best from FIG. 3, a greatly simplified version of FIG. 2. The signal source $e_s$ connects to a first capacitor CT1 (total capacitance) through a resistor R*s*+RD1 representing the total resistance of the signal source (resistor R*s*) and the forward resistance of a fired diode D1. Diodes D4, D7 in a conductive state are shown as equivalent resistors RD4, RD7 respectively. The circuit values are such that resistance R*s*+RD1 is approximately twenty times greater than either of the diode resistances RD4, RD7. Thus, when the first diode D1 fires, current *i1* flows from source $e_s$ to charge the total capacitor CT1 which soon applies a firing potential to a second diode RD4 which fires. Then current *i2* flows from the first total capacitor CT1 to a second total capacitor CT2 through resistor RD4. In adidtion, the charges on the two total capacitors CT1, CT2 equalize, thus slightly lowering the potential on the first charged total capacitor CT1. This, in turn, draws additional source current *i1* through the first diode RD1 to hold it "on." It should be noted that the principal portion of current *i2* comes from the charge on the total capacitor CT1. Therefore, as will be explained, the current through diode D1 does not increase more than the surge point indicated as I*g* (FIG. 8*b*).

Any succeeding stages function in the same manner. That is, the voltage on the second total capacitor CT2 soon reaches firing potential for the third stage, and diode D7 fires. Current *i3* flows from the second total capacitor CT2 and the first total capacitor CT1 to ground at link switch 32. Again, the current flow does not increase in either diode D1 or diode D4 because the principal current is supplied by the charged capacitors.

Figure 4:
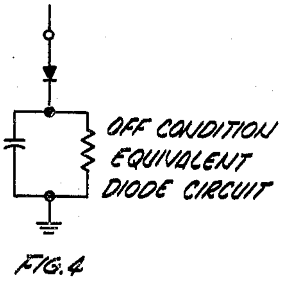
FIG. 4 shows the equivalent circuit for a single PNPN diode when switched "off"
Figure 5:
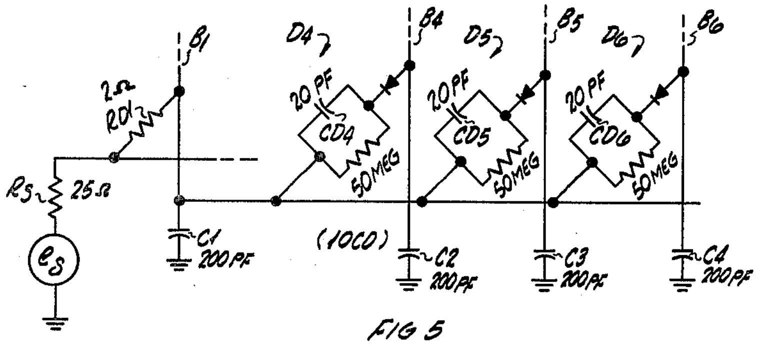
FIG. 5 shows another equivalent circuit of FIG. 2 with the diode equivalent circuit of FIG. 4 substituted therein.

The exact nature of the equivalent total capacitance CT is illustrated in FIGS. 4, 5. In FIG. 5, it is assumed that the diode D1 (FIG. 2) has fired and is, in effect, a relatively small resistance RD1. Each connected diode D4, D5, D6 that has not fired is replaced by its equivalent circuit (FIG. 4). Thus, after the diode D1 fires, the source $e_s$ "sees" a total capacitance CT1 which is approximately equal to the parallel capacitances of the first vertical bus B1 control capacitor C1, and all of the associated diode capacitances CD4, CD5, and CD6. The vertical bus capacitance C2 is preferably in the order of ten times the diode capacitance, as indicated by the notation 10CD, thus virtually eliminating the capacitor C2 as a factor to be considered when calculating the total capacitance CT.

The truth of this statement is obvious from the well known mathematical formula for a series capacitor circuit, i.e.

$$\frac{1}{CT1}=\frac{1}{CD4}+\frac{1}{10CD}=\frac{11CD}{10CD}$$

Stated another way, the equivalent or total capacitance of the series circuit (CD4+10CD) is .909 times the capacitance of the diode (CD). The quivalent total capacitance CT1 is, therefore C1+KCD, where K is the number of intermediate vertical buses.

The operation of the circuit depends upon the "rate effect" firing of PNPN diodes, as explained by the curve of FIG. 6. There firing voltage $E_F$ is plotted on a horizontal axis and the rise time (*dv/dt*) of a voltage applied across a PNPN diode is plotted on a vertical axis. Thus, if a voltage pulse having a steep ramp front is applied across a diode, there is a large *dv/dt* as shown at point A and a low firing potential as shown at point $E_{FDA}$. If the voltage pulse has a slow rising ramp front, there is a small *dv/dt* as shown at point B and a high firing potential as shown at point $E_{FDB}$. Hence, it is apparent that the diodes will fire at different potentials depending upon the *dv/dt* of the voltage wave form applied to capacitors CT1, CT2, etc.

Several factors should be considered when designing a circuit having a correct *dv/dt* or slope of the ramp front. One such factor is the distribution of firing potentials of PNPN diodes from a production run of average tolerances. For example, with one fast rising wave form, unsorted diodes having an average production run tolerance fire when 10–26 volts are applied across their terminals. That is, the diode which fires at the lowest firing potential switches "on" at 10 volts and the diode which fires at the highest firing potential switches "on" at 26 volts. All other diodes switch "on" at intermediate voltages. With a slow rising ramp front wave form, the same unsorted diodes fire when 26–34 volts are applied across their terminals. Thus, when control pulses having fast rising wave forms are used, bias potentials inside the matrix are large relative to the control pulse voltage and, therefore, are controlling. On the other hand, when slow rising wave forms are used, bias potentials inside the matrix are small relative to the control pulse voltages, and the control pulse is controlling.

For an illustration of one effect with a fast rising wave form, consider the switching action when the diodes fire between 10 and 26 volts. Suppose that diode D10 (FIG. 1) has fired on a call from primary matrix 38, bus B6 is busy and stands at −12 volts, and bus B5 is idle and stands at +18 volts. The firing pulse is a negativing going voltage wave form. Finally, assume that diode D6 fires at 10 volts (the lowest firing potential); diode D5 fires at 26 volts (the highest firing potential). When the difference between point P1 and bus B6 is 10 volts (ie. point P1 is at −22 volts and bus B6 is at the busy −12 volts) diode D6 fires and connects point P1 to a busy bus B6. But this would not happen because the idle bus B5 stands at +18 volts; therefore, diode D5 would fire when point P1 reaches −8 volts. That is, the difference between point P1 and bus B5 must be 26 volts for the high firing potential diode D5 to fire.

Next consider the adverse effect which would occur if a slow rising wave form were used at point P1. The matrix bias voltages remain the same (i.e. −12 volts at busy bus B6 and +18 volts at idle bus B5). However, the lowest firing potential diode D6 fires at a slow rising 26 volts and the high firing potential diode D5 fires at a slow rising 34 volts. Thus, diode D5 fires when point P1 reaches −16 volts (ie. the difference between point P1 and bus B5 is 34 volts). Diode D6 will not fire until the point P1 reaches −38 volts (i.e. the difference between point P1 and bus B6 is 26 volts). A potential of −16 volts at point P1 can only be reached by a primary diode firing at 34 volts. Therefore, if point P1 were marked by a slow rising pulse only the highest firing potential primary diode is able to fire the highest firing potential intermediate diode, and all lower firing potential primary diodes will be unable to do so. Now assume that diode D1 fires at the lowest slow rise potential, i.e., 26 volts. Bus B1 would then go to −8 volts, and the potential across diode D5 is 26 volts (the high voltage, fast rise, firing potential). This fast rising potential is sufficient to fire any intermediate diode because they are assumed to fire between 10 and 26 volts on a fast rise. Next, assume that diode D1 fires at the highest slow rise potential, i.e., 34 volts. Bus B1 would then go to −16 volts, and the potential across diode D6 is +4 volts because bus B6 is at the busy potential −12 volts. This potential is insufficient to fire the diode D6 which is connected to a busy path. As a result, the voltage required to fire the lowest firing primary diode (viz., a slow rise 26 volts) is sufficient to fire the highest firing (a fast rise 26 volts) intermediate diode connected to an idle vertical. The highest firing primary diode (viz., a slow rise 34 volts) is insufficient to fire the lowest firing (a fast rise 10 volts) intermediate diode connected to a busy vertical.

The obvious advantage is that an idle line will not be connected to a busy vertical multiple when the control potential is large relative to the matrix biasing potentials.

A second factor to consider in selecting the *dv/dt* is the resonant points in the system. For example, the total capacitance CT and the inductance of the circuit leading from source $e_s$ through diode D1 (together with stray capacitances and inductances) form a resonant circuit. If the applied voltage pulse P has a component of the resonant frequency of this capacitive-inductive circuit, the current through the diode oscillates. When current reverses direction, the diode switches "off" if the charge stored on the internal diode capacitance is depleted. The voltage on capacitor C1 resulting from current flow while the diode was switched "on" prevents it from switching back "on" when current next reverses direction.

As those skilled in the art know, virtually all voltage wave forms include a number of frequency components (the so-called Fourier series). The steep wave fronts have an infinite number of frequency components. The low slope wave fronts have a relatively limited number of frequency components. Thus, the chances of ringing the resonant circuit leading to and including capacitance CT increase sharply with an increase in the steepness (*dv/dt*) of the wave form.

To select the *dv/dt* of the control pulse as it appear as the input of the intermediate matrix, it is only necessary to select a correct resistive value for the source resistor R*s*. When making this selection, the resistance R*s* is made large enough to hold the peak current flow I*g* (FIG. 8*b*) lower than the ringing point where the circuit breaks into oscillation. The resistance R*s* is made small enough to allow a peak current I*g* that is adequate to charge capacitor C1 over a desired time period. The time period is adequate for a switching path to find its way through the cascaded matrices under all anticipated traffic conditions. Stated another way, current flows through the various diodes to hold them "on" for a deisred period of time. Finally, the time constant product R*s*·CT1 is selected to give a correct *dv/dt* for controlling the firing through an intermediate matrix.

The circuit operates this way. Means are provided for completing a switching path through the cascaded matrices and between the end marked points. More particularly, a signal source $e_s$ transmits a voltage pulse P (here shown of negative polarity) having a relatively low (*dv/dt*) rise time. Additionally, a source resistor R*s* limits the current available from the signal source. Thus, the diode D1 has a relatively high firing potential. Second, the capacitors $C_1$, $C_2$ have a fast charge time limited only by resistance R*s*, and the diodes D4, D5, D6 will fire at relatively low firing potentials because they are firing at the rate effect potentials. In one exemplary circuit, the circuit gave excellent results when the components had the values shown in the drawings. From the foregoing, it will be apparent that electronic switching matrices are provided which may be cascaded to complete a path between end marked points. Moreover, this path is completed with a minimum amount of expensive control circuitry. Instead, the control circuitry uses readily available components controlled by reliable capacitor characteristics.

Before the pulse P appears, the left-hand (as viewed in FIG. 2) terminals of diodes D1, D2, D3 are at —E potential, and the right-hand terminals are at +E potential. After the pulse P appears, the capacitor C charges to increase the negative potential on the left-hand terminals of diodes D1, D2, D3. The diode 34 keeps the negative pulse voltage out of battery —E. Diodes D1, D2, D3 theoretically have the same characteristics; therefore, all will fire at about the same potential. However, these components almost never have identical characteristics. Thus, each of these diodes will fire at a potential which is infinitesimally different from the firing potentials of every other diode. One will almost certainly fire first. Hence, it is assumed that diode D1 fires when the potential on its left-hand terminal reaches the potential $E_{FD1}$.

The +E potential on bus B1 goes to the negative potential of the firing pulse P after the diode D1 fires. The drain of charge from capacitor C causes the source pulse potential P to become less negative at the left hand terminals of diodes D2 and D3. Thus, the left-hand terminals of diodes D2, D3 immediately become less negative, and they cannot fire. This lag negative voltage is shown at point 40 in FIG. 7*a*. Also at the instant of firing, current $i1$ (FIG. 3) starts to flow with a surge at a peak level (point I*g*, FIG. 8*b*). This surge is the highest current that diode D1 ever carries as the switching paths are completed and is limited by source resistance R*s* plus the fired diode resistance RD1 (FIG. 3). As the capacitor CT1 charges, the current $i1$ tapers off in accordance with the well known capacitor discharge law $i=Ige^{-t/R_s \cdot C_{T1}}$ where $t$ is time.

The voltage building on capacitor C1 is a voltage signal source for diodes D4, D5, and D6 of the intermediate matrices. When the point $E_{FD4}$ (the firing voltage of diode D4, assuming it has the lowest firing voltage) is reached, the lowest firing potential diode in the intermediate matrix 21 connected to capacitor C1 fires. The rise time $dv/dt$ of the voltage building on capacitor C1 is extremely fast compared to the rise time of the pulse P ramp front; therefore, diode D4 fires at a much lower potential as compared to diode D1.

The instant when the diode D4 fires, the battery +E2 makes the intersecting bus less negative. Thus, the voltage on capacitor C1 drops immediately to a voltage such that diodes D5, D6 do not fire. The results of this drop in voltage on capacitor C1 are: first, a flow of current $i_2$ (FIG. 3) from capacitor C1 through diode D4 to capacitor C2; second, an increase in the flow of current $i_1$ from the signal source $e_s$ through diode $D_1$ to capacitors C1 and C2; and third, a slight change (less negative) in the potential of the firing pulse P, as shown at 41 (FIG. 7a). This $i_1$ current increase is indicated by the rise in current from point I*m*, to point I*j* (FIG. 8*b*). As capacitor C1 recharges toward voltage $E_{FD1}$ this increase in current through diode D1 tapers in accordance with the principle $i_1=Ije^{-t/R_s \cdot C_{T1}}$.

The voltage built on capacitor C2 acts as a signal source for the connected diodes of the secondary matrix 22. Here, however, the lowest firing potential diode is not the first to fire. Rather a link has previously closed a specific switch, such as 32, to mark the right-hand terminal of a specific diode D7, for example. The remaining secondary matrix diodes D8, D9 have no potential on their right-hand terminals and, therefore, cannot fire regardless of the rate of voltage rise on capacitor C2.

When the charge on capacitor C2 reaches a firing potential, diode D7 fires. This completes a circuit from —E battery through diode 34, resistor 35, diodes D1, D4 and D7 to ground at switch 32. Thereafter, current through diode D1 remains at the maintenance level $I_m$ (FIG. 8*b*).

Means are provided for making a systematic search over switching paths through the cascaded matrices if a path is not completed between the end marked points. The paths are searched sequentially and individually until after either all paths have been searched or an idle path has been found. That is, the foregoing description of the circuit operation has assumed that the path was completed on the first try. However, this is not always possible. For example, one of the diodes D5 or D6 connected to capacitor C1 may have fired during the described call. Thus, a search of the secondary matrices connected to intermediate buses B5 or B6 would occur. Since closed contacts 32 do not connect to the searched secondary matrices, a path cannot be completed. Similarly diodes D2 or D3 may have fired initially and the intermediate matrices connected to primary buses B2 or B3 may not have access to the secondary matrix link which has been marked. Or, other conditions could occur because of traffic congestion. In any event, a PNPN diode, such a D1 must have as minimum current flow through it after it fires or it will "starve" and switch "off." Thus, in FIG. 8*b* the current $I_{D1}$ is shown as leveling at the maintenance level $I_m$ when the path is completed between —E battery and link ground at switch 32. If this path is not completed, the current $I_{D1}$ falls below the hold level $I_h$ and diode D1 switches off.

Assume first that diode D4 fires, but a path is not completed at diodes D7, D8, D9. Diode D1 holds "on" because the current $i_1$ flowing to capacitor C1 to replenish the charge on capacitor C1 exceeds the hold level $I_h$. The charge needs replenishing because it dropped with the current flow that peaked at $I_j$. Diode D4, however, starves for current and switches "off." The charge on capacitor C2 remains briefly, depending upon the rate of current flow through resistor 44. Thus, diode D4 is back biased from the charge on capacitor C2; it cannot refire from the voltage on capacitor C1. The voltage on capacitor C1 continues to rise to the voltage of the ramp front pulse P. Soon, this voltage reaches the firing potential of the second lowest firing potential diode in the intermediate matrix, diode D5, for example. The voltage of the ramp front pulse drops as shown at point 41 (FIG. 7*a*). After primary matrix diode D1 fires, and subsequently each time another intermediate matrix diode fires, the pulse voltage drops as shown at points 40–42. Since the first diode fired at voltage $E_{FD1}$, and capacitor C1 is charging toward voltage $E_{FD1}$ at a very fast rate virtually all idle intermediate diodes D4, D5, D6 connected to vertical bus B1 fire in sequence before the pulse P voltage changes substantially. As a result, one primary diode fires and probably $K_{idle}$ intermediate diodes fire in timed sequence before another primary matrix diode connected to the source $e_s$ fires—assuming of course that a path to a link was not complete through the first diode to a link.

The entire pulse P has a duration of 50 microseconds in one exemplary system. In that same system, the discharge time of capacitor C1 has a much greater time period, as shown in FIG. 7*c*. The decaying potential of the capacitors acts as a reverse bias on the fired and "starved" diode which bias cannot be overcome by voltage $dv/dt$ or P. Thus, each matrix diode is allowed to fire only once during the pulse period of P. This guard prevents multiple firing to one link and provides reverse current cutoff in diodes which have fired.

The current through diode D1 is sufficient to keep the diode "on" as long as the diodes in the intermediate matrix 21 are firing (i.e. for the duration of the pulses shown in FIG. 7*b*) because the spike pulses 40–42 cause recurring current surges. When these spikes pulses end, diode D1 switches "off" because it starves for current if a complete path to a link is not found. The resulting current through diode D1 is a sharp peak current pulse 50; sharp relative to the duration of the ramp front pulse P. Again, the voltage of the ramp front pulse continues to rise until it reaches the voltage of the second higher from the lowest firing potential diode in the primary matrix at point 51. For example, diode D2 may fire, and switching is repeated through an associated intermediate matrix. Assuming that no path is completed via diode D2, the current flowing through it is in the form of the spike pulse 52. Diode D2 starves. Then, the third higher from the lowest firing potential diode (D3, for example) fires as indicated at point 54 and the switching is again repeated through an associated intermediate matrix. Assuming that a path is completed this time, the rising voltage of pulse P terminates. Pulse voltage falls to the link ground potential and, as shown at point 55, the current through the diode D3 peaks as shown at 56 and then levels at the maintenance value, as shown at 55 (FIG. 7*d*).

The switch path releases when the link switch 32 opens to terminate current flow through the fired diodes.

Means are provided for reducing cross-talk in the switching matrix. As those skilled in the automatic telephone switching art know, cross-talk is the mixing of signal currents between separate signal paths. In the matrix of FIG. 1, for example, the diode D5 may close in one switch path and the diode D10 in another switch path. No current is supposed to flow through diode D6 because it is switched "off." However, no semiconductor really switches "off"; there always is a small reverse saturation current flow. Thus, some small increment of the currents through diodes D5, D10 pass through diode D6. This small increment in and of itself is not enough to cause a serious cross-talk problem. However, as the switch paths multiply through the matrices and all of these small reverse saturation increments accumulate, cross-talk can become disastrous to intelligible communication. The obvious answer is that the size of the matrix must be limited so that less than a critical number of paths can be completed. This, in turn, increases the number of matrices which must be cascaded; therefore, to increase the number of lines in a system, the total cost of the matrices increases. Thus, anything which can be done to reduce cross-talk gives an overall savings.

In carrying out this invention, cross-talk is reduced by selection of circuit values and biasing potentials. In greater detail, it has been found that the cross-talk results from the capacitance ($C_{D4}$, for example) of a switched "off" diode. Thus, a reduction of capacitance causes a reduction of cross-talk. Graphically, this is shown by the characteristic curve of FIG. 9. FIG. 9 plots diode capacitance vertically and firing potential horizontally. With no bias across a diode, its capacitance is large, as shown at point C. With firing potential $E_F$ applied across the diode, the capacitance $C_F$ is small compared with point C. For a portion 60 of this characteristic capacitance curve, the diode capacitance drops very fast as the applied potential increases. For the remaining portion 61 of the curve, increasing the bias potential produces very little change in diode capacitance and causes the diodes to fire under marginal switching conditions. The object is, therefore, to reduce unfired diode capacitances to a minimum consistant with reliable firing characteristics. It has been found that this point is reached when the bias is one-half the firing potential or $.5E_F$ on the curve of FIG. 9.

When the cascaded matrices are used in a telephone system, digit pulses are stored in the selected link. Then a marking is applied to the line circuit of the called line (line circuit 62, FIG. 1, for example) and at the link (as at switch 32, FIG. 2) so that a path fires from the called line to the selected link. Thereafter, calling and called subscribers talk to each other over a path which includes the randomly selected crosspoints. For example, this path may include subscriber station 30 (FIG. 1), diodes D1, D4, D7, link 31, diodes D15, D10, D16, and subscriber station 62.

It is to be understood that the foregoing description of a specific example of the invention is not to be considered as a limitation on its scope.

I claim:

1. An automatic switching system comprising a plurality of cascaded matrices, each of said matrices including first and second multiples arranged to provide intersecting crosspoints, means responsive to a simultaneous marking of the ends of a desired path at a multiple in one of said matrices and a multiple in another of said matrices for initiating a systematic search sequentially and individually over a plurality of self-seeking paths extended via randomly selected crosspoints in said cascaded matrices, and means responsive to the completion of a first of said paths between said marked multiples for terminating said systematic search over said paths.

2. The automatic switching system of claim 1 and means for providing a reduction in cross-talk in said matrices comprising a source of biasing potential connected across said crosspoints.

3. An electronic switching telephone system comprising means for initiating a systematic search sequentially and individually over a plurality of self-seeking paths through randomly selected crosspoints in a multi-stage switching network responsive to an application of a potential difference across the ends of said paths, means responsive to an absence of current flow over an incompleted path for releasing each of said randomly selected crosspoints in each path which is not completed through said network, and means responsive to current flow over a completed one of said paths for holding said one path.

4. An electronic switching system comprising a plurality of cascaded matrices, each of said matrices including first and second multiples arranged to provide intersecting crosspoints, means responsive to a simultaneous marking of the ends of a desired path at a multiple in one of said matrices and a multiple in another of said matrices for initiating a systematic search through a plurality of self-seeking paths extended via randomly selected crosspoints in said cascaded matrices, the marking applied to at least one of said multiples including a pulse having a slow rising wave form, and means responsive to the completion of one of said paths between said marked multiples for terminating said search through said paths.

5. The electronic switching system of claim 4 and means for completing said systematic search over all said paths during the interval measured by the slow rising time of said marking wave form.

6. The electronic switching system of claim 5 and means for reducing cross-talk in said matrix.

7. A telephone system comprising a plurality of cascaded matrices, each of said matrices including first and second multiples arranged to provide intersecting crosspoints, means for selectively marking a first multiple in a first matrix of said cascaded matrices by a switch controlling voltage pulse having a ramp front of relatively long time duration for initiating a switching search over said crosspoints to establish a connection to another of said multiples, said search being completed on a one path at a time basis, means responsive to a failure to complete a connection over one of said paths within a predetermined period of time for releasing all of said cross-points in said one path, means for precluding another search over said one path, and means for causing another search over another of said paths responsive to said ramp front pulse.

8. An electronic switching telephone system comprising a plurality of cascaded matrices, each of said matrices including horizontal and vertical multiples arranged to provide intersecting crosspoints, a PNPN semiconductor switching device connected between intersecting horizontal and vertical multiples at each of said crosspoints, means responsive to the application of a ramp front voltage pulse of one polarity to one of said multiples for firing one of the PNPN devices connected thereto, thus passing the potential of said pulse through said fired PNPN devices to the intersecting multiple at that crosspoint, said fired PNPN device starving for want of current if a current carrying path is not completed through said device within a predetermined period of time, means responsive to a failure to complete a path through said matrices before said device starves for switching off said fired PNPN device and firing another of said PNPN devices, thus passing the potential of said pulse through said other fired PNPN device to the intersecting multiple at that crosspoint, means responsive to a marking of opposite polarity applied to another of said multiples for causing current flow through at least one of said fired PNPN devices, and means responsive to said current flow for blocking the extension of connections through other of said PNPN devices.

9. The electronic switching telephone system of claim 8 and means including at least one capacitor connected to said intersecting multiple for supplying a voltage signal for firing PNPN diodes in a succeeding matrix and for supplying a holding current flow through said one PNPN diode.

10. The telephone system of claim 9 and means responsive to a voltage stored on said capacitor for preventin a refiring of said one PNPN diode if a switch path is not completed through said other PNPN diode before said holding current ends.

11. A telephone switching system comprising a plurality of switching points, a plurality of subscriber lines having access to said switching system, means responsive to a simultaneous application of switch controlling signals to said switching system for initiating a switching search between two of said subscriber lines via said switching points, at least one of said switch controlling signals having a relatively slow rising ramp front, and means for completing said switching search during the time interval required for said ramp front to rise.

12. The switching system of claim 11 and capacitor controlled means for preventing said switching search from extending over the same path twice.

13. The switching system of claim 12 wherein each of said switching points comprises a PNPN diode, and means for biasing said diodes to approximately one-half its firing potential.

14. An electronic switching matrix comprising a plurality of first and second multiples arranged to provide intersecting crosspoints, means for identifying a selected first multiple by a control pulse having a slow rising ramp front wave form, means responsive to simultaneous marking of said selected first multiple by said control pulse and of a selected second multiple by an idle marking for ititiating a switching search over idle crosspoints to establish a connection between said marked multiples, said crosspoints firing in sequence, means responsive to the firing of each of said crosspoints for charging a capacitor via the intersecting multiples at the fired crosspoints, and means controlled by the charging times of said capacitors for controlling said switching search.

15. The electronic switching matrix of claim 14 wherein said charging time of a capacitor connected to a first multiple extends beyond the time period measured by said slow rising ramp front.

16. The electronic switching matrix of claim 15 and at least one succeeding matrix connected to the said selected second multiple, said succeeding matrix having a construction similar to the construction of the first named matrix, the charging time of the capacitors connected to said first multiples in said succeeding matrix charging quickly relative to said slow rising ramp front and during a fraction of said time period, means whereby said charges on either of said capacitors prevent reoperation of the associated crosspoint during a single time period measured by said pulse, and means controlled by the charge time of the capacitors for causing said crosspoints to release if a switching path is not completed through said matrix.

17. A switching network comprising a pluraliy of inlets and outlets and a plurality of paths therebetween, said paths therebetween comprising a plurality of PNPN diode crosspoints having similar firing potential characteristics which vary within production tolerance limits, a source of switching control voltage pulses having a ramp front of relatively long duration, means including said crosspoints for selecting one of said plurality of crosspoints when said ramp front voltage rises to the lowest firing potential of any diode, means responsive to the completion of a path between one of said plurality of inlets and one of said plurality of outlets for holding said selected crosspoint, and means responsive to a failure to complete a path between one of said plurality of inlets and one of said plurality of outlets for selecting another of said plurality of crosspoints when said ramp front voltage rises to a voltage which fires the diode having a firing potential which is the next lowest firing potential.

18. A switching system comprising a plurality of inlets and a plurality of outlets, means including a network of cascaded stages of parallel connected electronic switching devices for extending switch paths from any of said inlets to any of said outlets, said electronic switching devices having similar but not identical switching characteristics whereby an application of a switching signal at one of said inlets causes one of said switching devices having fast switching characteristics to switch "on" before another of said switching devices having slow switching characteristics, a source of switching potential having a slow rising ramp front output characteristic, whereby only said one switching device switches "on" when said ramp front voltage reaches a firing potential for said one switching device, means comprising a charge accumulating device associated with said one switching device for holding said one switching device "on" for a predetermined period of time while said charge accumulates, and means effective after a substantial completion of the accumulation of a charge for switching "off" and holding "off" said one device if a switching path is not then completed through said network, thereby allowing said other device to switch "on."

19. A network including similar, but not identical, parallel connected bistable, two terminal semiconductor switching devices; the characteristics of said devices being such that said devices switch to one stable state responsive to an application of a relatively high voltage across said two terminals, are held in said one stable state responsive to a greater than a predetermined rate of current flow through said device, and are switched to the other of said bistable states when said current flow falls below said predetermined rate; means for applying a switching potential having a ramp front characteristic across said parallel connection, whereby only the one of said parallel devices having a lower switching voltage characteristic switches to said one stable state; means responsive to said one device switching to said one state for drawing current through said one device for a predetermined period of time adequate to complete a switch path through said network; means responsive to termination of said period of time for drawing current through said path if completed through said network, thereby holding said one device in said one state, said one device switching to said other stable state at the end of said period of time if said current does not flow over said completed path, and means responsive to the rise of said ramp front potential after said one device switches to said other stable state for switching another device having a higher switching voltage characteristic to said one stable state.

20. A switching system comprising a plurality of inlets and a plurality of outlets, means including a network of cascaded stages of parallel connected electronic switching devices for extending switch paths from any of said inlets to any of said outlets, said electronic switching devices having similar but not identical switching characteristics whereby an application of a switching signal at one of said inlets causes one of said switching devices having fast switching characteristics to switch "on" before any other of said switching devices having slower switching characteristics, a source of switching potential having a ramp front characteristic which does not include any frequency component that corresponds to switch path resonance, means comprising a charge accumulating device associated with said one switching device for holding said one switching device "on" for a predetermined period of time while said charge accumulates, and means effective after a substantial completion of the accumulation of a charge for switching "off" and holding "off" said one device if a switch path is not completed through said network thereby allowing said other device to switch "on."

References Cited by the Examiner

UNITED STATES PATENTS

| | | | |
|---|---|---|---|
| 2,779,822 | 1/57 | Ketchledge | 179—18 |
| 3,027,427 | 3/62 | Woodin | 179—18 |
| 3,033,936 | 5/62 | Simms | 179—18 |
| 3,047,667 | 7/62 | Hussey | 179—18 |
| 3,055,982 | 9/62 | Kowalik | 179—18 |

ROBERT H. ROSE, *Primary Examiner.*

WILLIAM C. COOPER, *Examiner.*